United States Patent Office 3,156,147
Patented Nov. 10, 1964

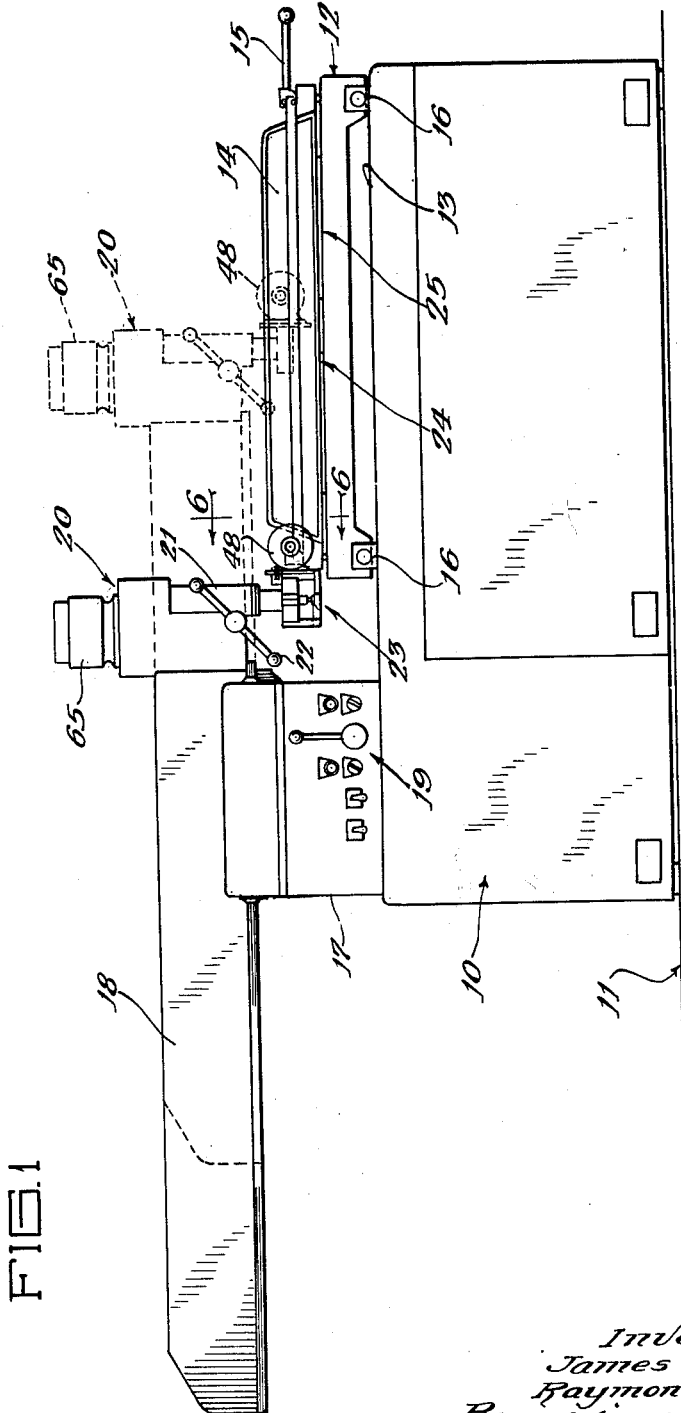

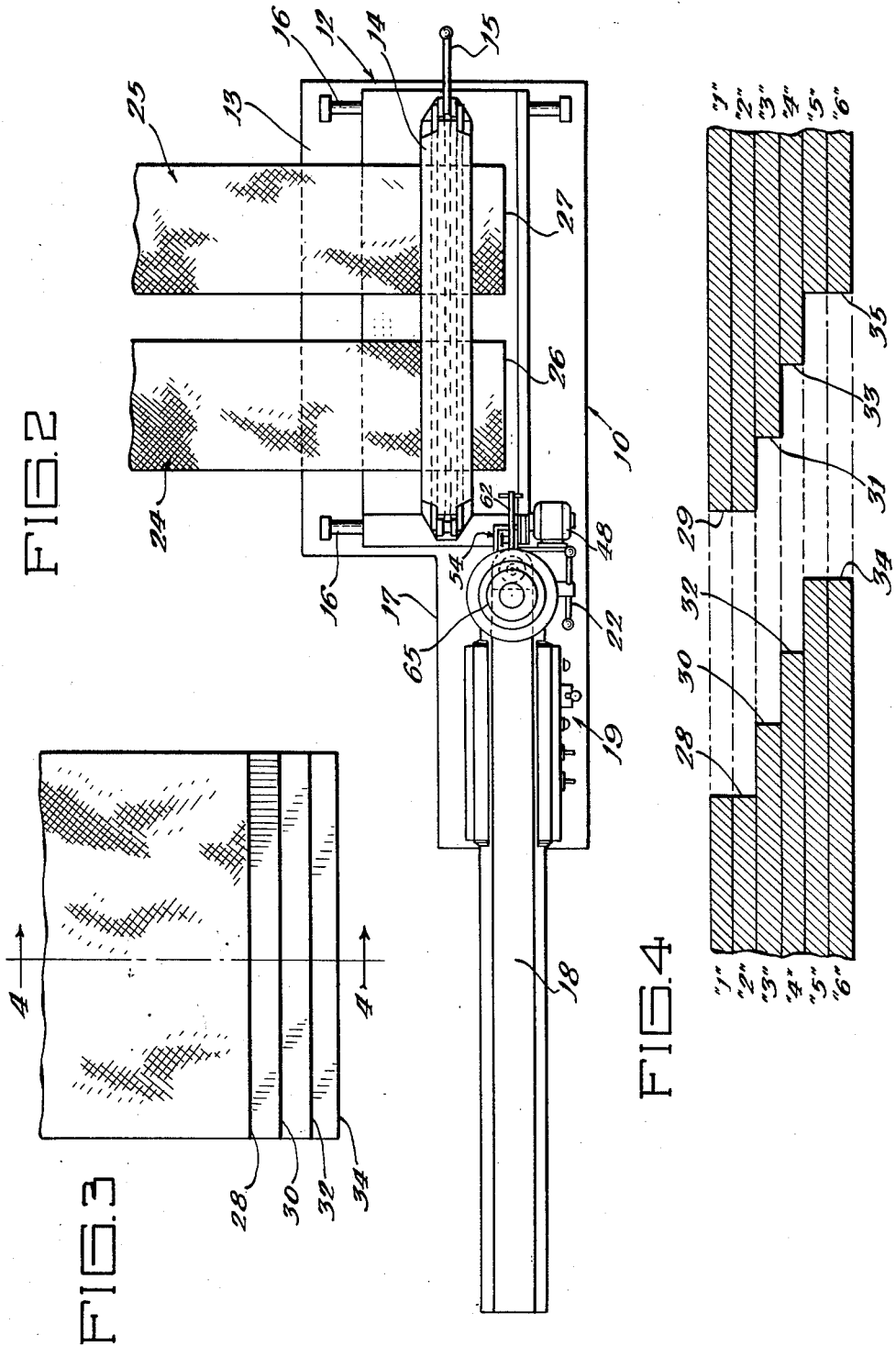

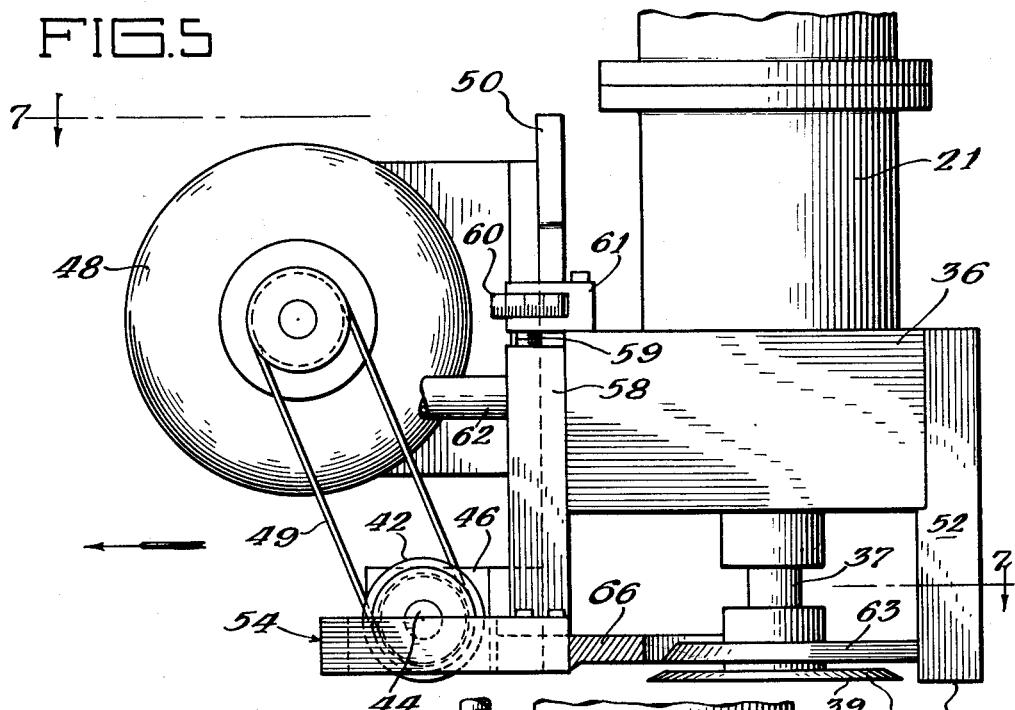
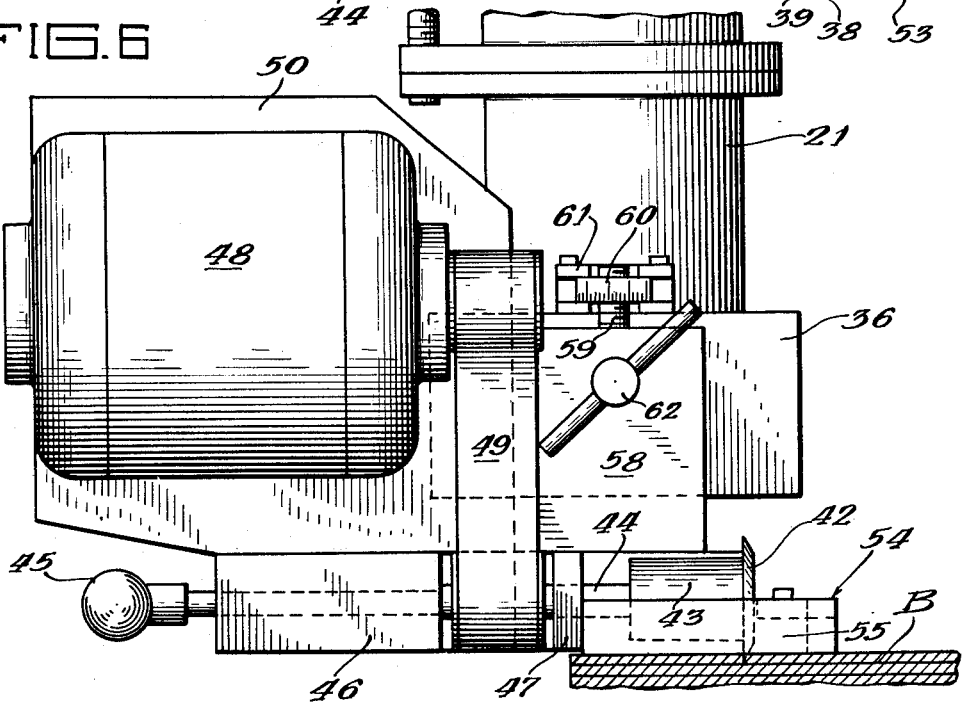

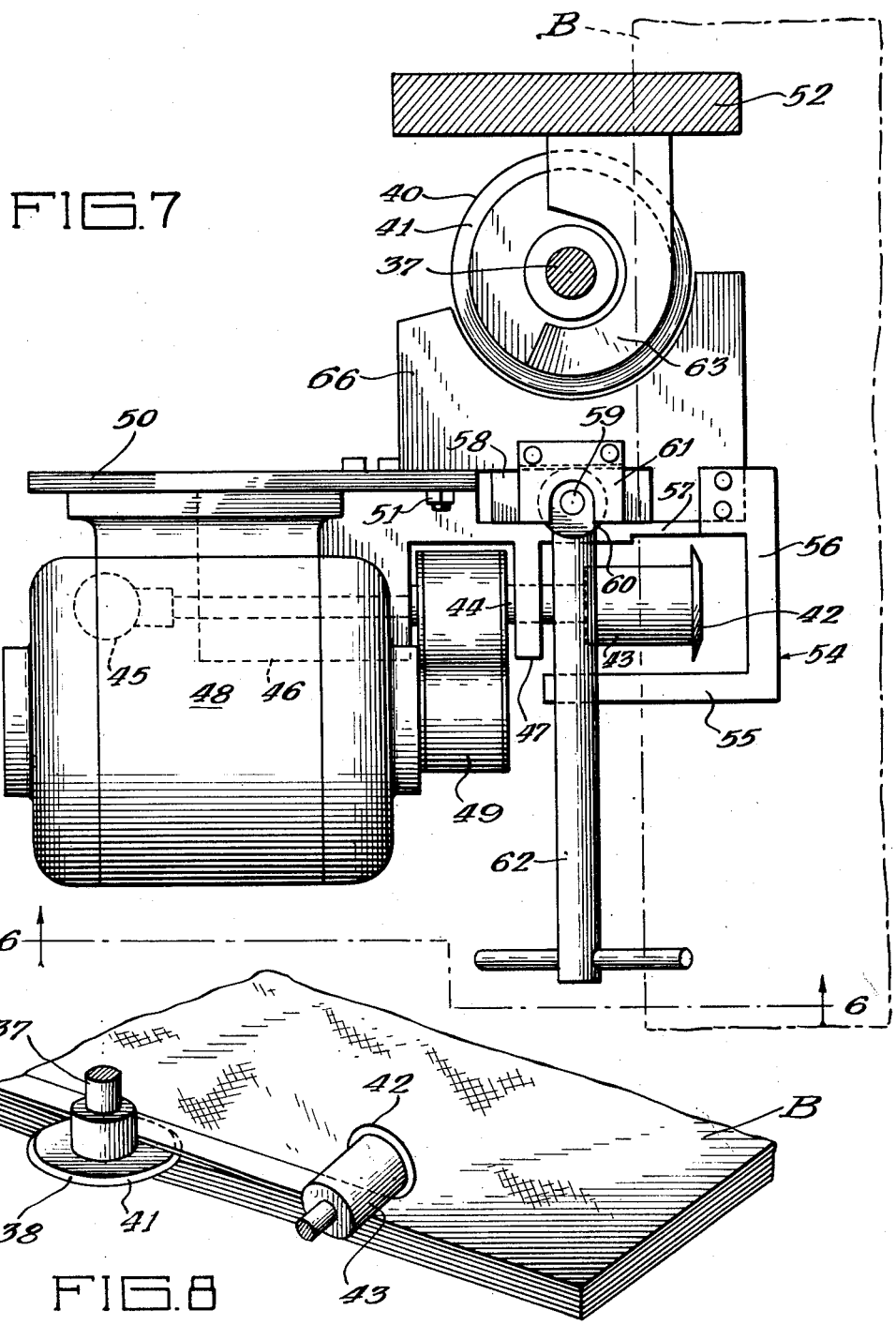

3,156,147
BELT SHAVING MACHINE
James A. Linn, Evanston, and Raymond E. Smith, Lake Forest, Ill., assignors to Burrell Belting Company, a corporation of Illinois
Filed May 2, 1962, Ser. No. 191,979
12 Claims. (Cl. 83—5)

This invention relates to a machine for shaving the end of woven fabric belt stock for splicing purposes.

Many industrial uses of belts in conveyor systems, manufacturing purposes and the like require relatively heavy and strong belts. Many such belts are endless in character but are manufactured in a continuous form after which they are cut to proper length and spliced. The particular belts referred to herein are of woven fiber or thread material and employ a number of plies secured together by sewing, adhesive or in other suitable fashions. The plies of the belt are secured together or united in a fashion to make a unitary belt structure quite strong yet flexible.

In the past the splicing of such woven belts has required an initial operation performed by hand. The cutting of the plies apart and the step cutting of the various plies so that they can match and mate with an opposite end of the belt has required much training and practice on the part of a workman so that in commercial practice only skilled artisans could properly perform such hand operations. The exactitude with which the belt ends must be prepared is caused by the desire to splice the woven belts in a manner which will allow the splicing area to have physical characteristics not too dissimilar from other areas of the belt. The spliced area should have a quality as strong as the remainder of the belt as well as being flexible and of no greater thickness.

It is the primary object of this invention to provide a belt slicing machine which can accurately prepare belt stock for splicing purposes.

Another object is to provide a new and improved machine for accurately preparing opposite ends of a belt stock so that they may accurately mate at a splice between such ends.

Another object is to provide a belt slicing machine capable of removing one or more plies from a woven fabric belt without harming adjacent fibers or fabric.

A further object is to provide a new and improved belt slicing apparatus for removing plies from a belt end in which the control of the slicing operation is in part received from a guide upon the belt stock itself.

Other objects, features and advantages of the present invention will be apparent from the following description of a preferred embodiment illustrated in the accompanying drawings, in which:

FIGURE 1 is a side elevational view of the belt slicing machine of this invention showing the position of the head in full and dotted lines;

FIGURE 2 is a top plan view of the machine illustrated in FIGURE 1;

FIGURE 3 is a fragmentary top plan view of a fabric belt end after being sliced by the machine;

FIGURE 4 is a diagrammatic side elevational view of the end of a belt showing the steps between the plies as taken substantially along line 4—4 in FIGURE 3 and including the opposite end of the belt to be mated therewith;

FIGURE 5 is a side elevational view on an enlarged scale of the head of the machine;

FIGURE 6 is a front elevational view of the head of the machine shown in FIGURE 5 and taken substantially along line 6—6 in FIGURE 1;

FIGURE 7 is a horizontal sectional view through the head of the machine taken substantially along the line 7—7 in FIGURE 5; and FIGURE 8 is a diagrammatic perspective view illustrating the relationship of the cutting wheels relative to the belt during a belt slicing operation of the machine.

The machine for shaving the ends of the belt stock is shown generally in FIGURES 1 and 2. The machine has a base 10 which may sit upon a factory floor 11 to support the working part of the machine at approximately bench height. A relatively heavy bed 12 is mounted upon a platform 13 for the purpose of supporting belt stock in position to be shaved. A relatively heavy clamp 14 is provided with a manually operable handle 15 by which the end portions of a belt may be fixed securely in position upon the bed 12. The bed is provided with a guide bar 16 at each end by which the bed may be guided and moved transversely of the base 10.

The base of the machine includes a column 17 upstanding for the purpose of supporting a ram 18 reciprocally mounted so as to traverse the bed 12 of the machine. A motor drive (not shown) for the ram 18 is included within the base of the machine and under the influence of controls generally indicated 19 may cause the ram to reciprocate across the bed and back. The ram carries a head 20 which includes the means for shaving the ends of the belt. The head includes a vertically movable spindle 21 which may be raised and lowered under the influence of a handle 22 to raise and lower the cutting portion 23 of the head toward and away from the bed of the machine.

As best illustrated in FIGURE 2, two separate belt stocks 24 and 25 are shown as clamped to the bed by the clamp 14 in a position so that the ends 26 and 27 of such stock and the portions of the stock immediately adjacent the ends may be properly shaved in preparation for making a splice. It is important that the mating ends of a belt be similarly prepared so that a proper mating at the splice will occur.

In order to illustrate the steps involved in the shaving of belt stock for splicing purposes, a belt is shown diagrammatically in FIGURES 3 and 4. As a specific example, a six-ply woven belt of cotton material may be prepared for splicing opposite ends of the stock to make a continuous belt. In FIGURE 4 the plies are numbered 1 to 6 and diagrammatically illustrated as extending between the horizontal lines dividing one ply from another. It will be understood that the ply number 1 on the left hand side of FIGURE 4 will appear at the top of the belt stock and when the opposite end is brought around to form a closed figure of a continuous belt, ply number 1 will mate opposite as indicated by the ply numbered 1 on the right hand side of FIGURE 4. The belt shaving machine is intended to sever the various plies in a stepped fashion across the six plies of the belt. Such a belt is between generally ¼ inch and ⅜ inch thick with each ply having a thickness of about .065 inch to .070 inch. The particular belt illustrated is one about twelve inches wide. The entire splice may occupy a longitudinal length of the belt of about three inches.

The steps involved in preparing the belt stock for the splicing may first involve the cutting away of plies number 1 and 2 to the depth of the line 28 shown in FIGURE 4 on the left hand side. The end of the belt at 29 on the opposite end of the stock would be intended to mate with the ends of the plies number 1 and 2 at the line 28. The next cut across the belt may sever ply number 3 at the line 30. Similarly ply number 3 is cut off on the right hand side of FIGURE 4 at the line 31 the same distance from line 29 as the distance between the lines 28 and 30 so that the ply number 3 will mate in end to end relationship accurately when the ends of the belt stock are brought together. A subsequent cutting step may cut off ply number 4 at the line 32 at one end of the belt and ply number 4 at the line 33 at the opposite end. Accuracy again requires that the ply number 4 be so accurately cut that the ends of the threads in the ply will abut end for end at the time that plies 1, 2 and 3 similarly would abut if brought together. Plies 5 and 6 may also be cut off at opposite ends of the belt, respectively, at the lines 34 and 35 diagrammatically illustrated in FIGURE 4. The thickness of the individual plies of the belt and the accuracy with which the plies must be cut without disturbing the adjacent plies is accomplished by the machine of this invention whereas prior to this time such cutting was generally accomplished by skilled persons in a hand operation.

The cutting head 23 by which the shaving is accomplished is illustrated in FIGURES 5 through 8. The vertically movable spindle 21 carries a relatively heavy block 36 at its lower end to which a part of the mechanism is secured. Extending down through the spindle 21 is a shaft 37 supporting at its lower end a cutting slicing wheel 38. This wheel is oriented in a horizontal plane with the flat lower surface 39 intended to move in between the plies of the belt. The wheel is provided with a sharp cutting edge 40 with the bevel 47 extending upwardly therefrom to the upper surface of a wheel. The wheel 38 is independently driven by an electric motor 65 mounted on the upper end of the head 20.

In advance of the slicing wheel 38, an upright cutting wheel 42 is mounted to cut into the belt in the direction of its thickness. The cutting wheel 42 is mounted upon a supporting cylindrical member 43 supported upon an idler shaft 44 movable by means of a hand knob 45 longitudinally of the shaft through bearing supports 46 and 47. The wheel is independently driven by an electric motor 48 through a belt drive 49. The motor, bearing supports and upright cutting wheel 42 are all supported upon a base plate 50 secured to the enlarged block 36 at the bottom of the movable spindle. The plate 50 is vertically adjustably secured to the block 36 by a plurality of machine screws 51 passing through slots in the plate so that the position of the cutting wheel 42 relative to the spindle and block 36 may be adjusted.

In the present machine a very accurate control of the depth of cutting by the upright cutting wheel 42 and the slicing wheel 38 is accomplished. The spindle 21 carried by the ram may be raised and locked in a raised position or, in the alternative, may be lowered to ride by its own weight over the bed 12. The depth of cutting is controlled by guide feet both in front of and trailing the cutting wheels. A rear foot 52 is provided with a lower surface 53 a few thousandths of an inch below the lower flat plane of the slicing wheel 38. Generally it is preferred that this lower surface of the rear foot be between .005 inch to .008 inch below the plane of the slicing wheel. The rear guide foot is thus fixed in position relative to the slicing wheel and may ride upon the surface of the belt remaining after passage of the slicing wheel through the belt. The bottom surface 39 of the slicing wheel is thus prevented from resting upon and binding against the surface of the belt stock.

The depth of cutting by the upright wheel and the slicing wheel is controlled primarily by a front guide foot 54 adjustable in relationship to the cutting wheels and rear guide foot. The front foot is generally U-shaped as shown in FIGURE 7 having a cross piece 55 in front of the cutting wheel 42, a rearwardly extending portion 56 extending beside the wheel, and a portion 57 extending past the rear of the wheel to the supporting block 58 extending in an upright direction. The block supporting the front foot is provided with a threaded shaft 59 provided with a fine thread received within a micrometer adjusting wheel 60 held against vertical movement by an embracing block 61. An accurate fine adjustment in the order of .001 inch increments of adjustment may be made in the height of the front guide foot relative to the cutting wheels. Once the adjustment is made, the block 58 and thus the front guide foot is locked to the stationary block 36 by means of a hand-operated locking screw shaft 62 which locks the block 58 against the block 36 on the spindle. The front foot has a rearwardly extending guard 66 about the front of the slicing wheel 38 (FIGURES 6 and 7).

In operation the upright cutting wheel slices through the ply of the belt to be removed while the trailing horizontal slicing wheel severs the ply from the balance of the belt. A guide is provided for deflecting the cut material around the shaft 37 supporting the slicing wheel. This guide has an arcuate portion 63 extending around the shaft 37 closely adjacent the side of the slicing wheel and extends rearwardly to a support on the rear stationary foot 52. The guide will deflect the material upwardly and away from the shaft of the slicing wheel.

As illustrated diagrammatically in FIGURE 8, a belt B may be first severed by the leading upright cutting wheel 42 and then the ply separated from the balance of the belt by the slicing wheel 38. The two cutting wheels and the rear guide foot are all supported in a preselected position relative to each other. The adjustment of the depth of cutting is made entirely with adjustment of the front foot 54. Referring to FIGURE 4 the first cut into the belt stock may employ a cutting only of ply number 1 along the line 28 with the following slicing wheel 38 extending between plies number 2 and 3. Ordinarily, the adjustment of spacing between the upright wheel and horizontal wheels is made to remove a single ply without damaging or severing any of the threads in the ply immediately therebelow. In the event that ply number 2 is not completely severed in one pass of the machine over the belt end, it is quite simple to remove ply number 2 by hand since it is materially free and loose. In starting to slice or to shave a belt, the movable spindle 21 on the head 20 is released so that the front foot rests upon the belt stock. The ram 18 moves the head across the belts making the cut as described with the bed being indexed between cuts. Each end of the belt stock may thus begin with an accurately cut stepped arrangement of the plies to mate accurately in the splice area. Additional work, of course, has to be performed to prepare the thus cut stock for splicing. Filling threads are removed, some threads frayed and adhesives used in making the splice. In some instances, sewing is also used.

The foregoing detailed description has been given for clearness of understanding only and no unnecessary limitations should be understood therefrom for some modifications will be obvious to those skilled in the art.

We claim:

1. A machine for shaving ends of a woven belt for splicing purposes, comprising: a base including a bed having means for clamping a woven multi-ply belt thereon with an end portion of the belt exposed; a head mounted on said base, said head being reciprocally movable across the bed and across said exposed end portion of the belt; an upright cutter wheel mounted on the head in position to cut into the belt on the bed in the direction of the thickness thereof; a slicing wheel on the head in position to cut into the belt on the bed between plies thereof, said slicing wheel being in tandem and following said upright cutter wheel, and means for accurately positioning said cutting and slicing wheels relative to said bed during movement of the head thereover whereby said wheels may sever a single ply from a multi-ply woven belt on said bed.

2. A machine for shaving belt ends as specified in claim 1 wherein the upright cutter wheel and the slicing wheel are mounted on said head in a selected fixed relation one to the other and a guide shoe is provided on the head for sliding contact with said exposed belt end, said head being movable toward and away from said belt by said shoe to gauge the depth of cut through such belt end.

3. A machine for shaving belt ends as specified in claim 1 wherein the upright cutter wheel and the slicing wheel are provided with means to guide the same on said exposed belt end during travel of the head across such belt end with the weight of said head biasing said cutter wheel and slicing wheel toward said belt end.

4. A machine for shaving belt ends as specified in claim 1 wherein the upright cutter wheel and the slicing wheel are mounted on said head in a selected fixed relation one to the other and a front guide shoe is provided on the head for sliding contact with the exposed belt end and a rear guide shoe is provided on the head for sliding contact with the portion of the exposed belt end following said slicing wheel.

5. A machine as specified in claim 4 wherein the front guide shoe is adjustably mounted on said head for selected movement relative to said wheels in a direction across the thickness of said exposed belt end and said rear guide shoe is fixed in position relative to said wheels.

6. A machine for shaving belt ends as specified in claim 1 wherein said slicing wheel has a flat face generally in the plane of the exposed belt end with a sharp edge at its periphery in the plane of said lower face and deflector means extend over said slicing wheel to lift a severed ply of said belt from the exposed belt end as the head moves across said belt end.

7. A machine for shaving ends of a woven fabric belt for splicing purposes, comprising: a base including a bed for clamping a woven multi-ply belt thereon with an end portion of the belt exposed; a head mounted on said base for reciprocation across the exposed portion of said belt and across said bed; an upright cutter wheel mounted on said head in position to cut into the belt on the bed in the direction of the thickness of the belt; a slicing wheel on the head generally oriented 90° to the upright cutter wheel and in position to cut into the belt between plies thereof, said slicing wheel and cutting wheel being secured in selected fixed relation on said head relative to each other; and a front guide foot on the head in position to engage and slide over the exposed portion of said belt in advance of said wheels, said guide foot being adjustable in the direction of the thickness of said belt to guide the wheels to predetermined cutting planes across the exposed portion of the belt whereby to sever a ply of said belt from the remainder.

8. A machine for shaving ends of a woven fabric belt as specified in claim 7 wherein each wheel is driven and an independent power source is carried by said head for each wheel.

9. A machine for shaving ends of a woven fabric belt as specified in claim 7 wherein a rear guide foot is secured to said head in trailing relation to said slicing wheel, said rear guide foot having a lower surface spaced toward the belt from said wheel to hold said slicing wheel away from plies of the belt remaining after passage of said wheels thereover.

10. A machine for shaving ends of a woven fabric belt as specified in claim 7 wherein the weight of said head and said wheels are biased by gravity toward the exposed belt and during cutting movement across the belt with the front guide foot sliding in contact with the belt to control the planes of cut of said wheels into the belt.

11. A machine for shaving ends of a woven fabric belt for splicing purposes, comprising: a base having a generally horizontal bed for receiving and holding a belt with an end portion exposed; a reciprocable ram on said base movable across the horizontal bed; a cutting head carried by said ram in position to move across a belt secured to said bed; a power driven upright cutting wheel on the head having a cutting edge positioned to cut into the belt in the direction of the thickness thereof and to be carried by said head progressively across the belt end; a power driven horizontal slicing wheel on the head in trailing position to said upright wheel and having a cutting edge oriented to slice into said belt generally parallel to said bed for cutting between belt plies, said wheels being secured to the head in selected fixed relation one to the other; a front guide foot secured to the head adjustably in a direction across the thickness of said belt, said foot being adjacent the upright cutting wheel to ride upon the belt for controlling position of the cutting wheels relative to the belt; and a rear guide foot on the head trailing said slicing wheel to ride upon the belt portion rearwardly of the slicing wheel, said head being biased toward said belt and bed during movement across a belt thereon.

12. A machine as specified in claim 11 wherein said cutting head is movable on said ram toward and away from said bed and said head is freely movable toward the bed during movement across said belt ends with the weight of the head being carried on said belt through said guide feet.

References Cited by the Examiner

UNITED STATES PATENTS

| | | | |
|---|---|---|---|
| 420,902 | 2/90 | Dougherty | 143—38 |
| 2,347,374 | 4/44 | Stahler | 143—38 |
| 2,803,869 | 8/57 | Brauchler | 143—38 |

ANDREW R. JUHASZ, Primary Examiner.

EDWARD C. ALLEN, Examiner.